United States Patent [19]

Arora et al.

[11] 4,340,431
[45] Jul. 20, 1982

[54] PIGMENT FLUSHING

[75] Inventors: Manohar L. Arora, Zeeland; Timothy A. Overway, Hamilton; Thomas E. Foye, Jenison, all of Mich.

[73] Assignee: BASF Wyandotte Corporation, Wyandotte, Mich.

[21] Appl. No.: 205,138

[22] Filed: Nov. 10, 1980

[51] Int. Cl.³ .................. C09C 3/10; C09D 17/00
[52] U.S. Cl. ................. 106/262; 106/308 F; 106/28; 524/156; 524/532
[58] Field of Search ............. 106/262, 28, 249, 308 F; 200/23, 23 R

[56] References Cited

U.S. PATENT DOCUMENTS

| | | | |
|---|---|---|---|
| 2,120,588 | 6/1938 | Curado | 106/28 |
| 2,137,794 | 11/1938 | Baffa | 106/249 |
| 2,192,954 | 3/1940 | Sloan et al. | 106/262 |
| 2,219,395 | 10/1940 | Moilliet | 106/262 |
| 2,689,222 | 9/1954 | Oathout | 106/249 |
| 3,256,202 | 6/1966 | Weiss et al. | 252/531 |
| 3,764,358 | 10/1973 | Papalos et al. | 106/249 |

OTHER PUBLICATIONS

Chemical Abstracts: 43:5213h.

*Primary Examiner*—Theodore Morris
*Attorney, Agent, or Firm*—Bernhard R. Swick

[57] ABSTRACT

A method for transferring an organic pigment from an aqueous pulp of the pigment to a water-immiscible organic vehicle. This method comprising mixing the aqueous pulp and vehicle with a petroleum sulfonate flushing aid and at least one flushing aid selected from the class consisting of sulfonated sperm oil, sulfated sperm oil, and mixtures thereof until a major portion of the water present in said pulp separates.

11 Claims, No Drawings

PIGMENT FLUSHING

BACKGROUND OF THE INVENTION

1. Field of the Invention

This invention relates to new and useful improvements in non-aqueous pigment dispersions. It relates particularly to the transfer of a pigment from an aqueous pulp or presscake directly into organic vehicles by an operation known to those skilled in the art as flushing. It relates more particularly to agents for the flushing of an organic pigment to provide a low viscosity dispersion having good tint strength.

2. Description of the Prior Art

The flushing of pigment presscakes, in order to disperse the pigment in an organic vehicle, is well known. Fish oil containing vehicles are commonly employed in flushing. The transfer may be effected in some cases by merely kneading the presscake and vehicle together until substantially all the water has separated. In most prior art methods, a surface-active agent is added to facilitate the transfer. There have been many attempts in the prior art to find different surface-active agents or surfactants, generally referred to as flushing aids, in order to solve specific problems such as the large amount of mechanical work required, a lack of tinting strength of the flushed color, and the like. Also, it is desirable to substitute lower cost vehicles which do not have a fish odor for the fish oil containing vehicles.

Many attempts have been made to find a flushing aid for an organic pigment which would provide a flushed color having a low viscosity and which can be used with vehicles other than fish oil-containing vehicles. The search has been complicated by the further requirement that the flushing aid should have little or no detrimental effect on the tint strength of the flushed color.

Sulfonates prepared from various organic materials have been tried as flushing aids. Reference is made in U.S. Pat. No. 2,120,588 to the use of a condensation product of naphthalene sulfonic acid with formaldehyde. Petroleum sulfonates have long been used as dispersing agents in the flushing of pigment presscakes. In many instances, however, the flushed color obtained has a higher viscosity than generally desired. Also, petroleum sulfonates have presented problems when used with vehicles other than fish oil containing vehicles. U.S. Ser. No. 109,414, filed Jan. 30, 1980 now U.S. Pat. No. 4,309,320, discloses an additive selected from the class consisting of sulfonated sperm oil, sulfated sperm oil and mixtures thereof as a flushing aid.

The use of cationic surface-active materials such as long-chain aliphatic quaternary ammonium, long-chain sulfonium, and long-chain phosphonium compounds as flushing aids, is taught in U.S. Pat. No. 2,192,954. In this patent, however, it is taught that such cationic material sometimes cause the formation of a water-in-oil emulsion which prevents the separation of the bulk of the water. In order to overcome that problem, U.S. Pat. No. 2,219,395 teaches the addition of a sulfonated fatty oil, a sulfonated aromatic compound or a fatty alcohol sulfate to the kneaded mass of pigment, water, oil and cationic material in order to reverse the objectionable water-in-oil emulsion.

U.S. Pat. No. 3,256,202 discloses improved surface-active agents including salts of sulfated hydrocarbon alcohols derived from sperm oil and suggests that they may be valuable as dispersants for dyes, pigments, etc. However, there is no disclosure of the use of sulfated or sulfonated sperm oils in a flushing process. Further, this patent is directed to mixtures of sulfated aliphatic hydrocarbon alcohols. These mixtures consist essentially of at least one salt of a sulfated lower aliphatic alcohol having from 1 to 4 carbon atoms and at least one salt of a sulfated higher aliphatic alcohol having at least 16 carbon atoms. Sulfated sperm oil is listed as one of the higher aliphatic alcohols. Mixture of the latter with the former is treated as essential to the invention.

U.S. Pat. No. 3,449,261 discloses a mixture of sulfonated hydrocarbons such as spermiceti oil and tris(-butoxyethyl)phosphate in dyeing operations. However, the disclosure is for use in dyeing textiles as a low-foaming wetting agent for the textile and not as a flushing aid.

Accordingly, it is a purpose of the instant invention to provide for flushing an organic pigment whereby a flushed color having a low viscosity and good tint strength will be available to the printing ink and coating industries.

SUMMARY OF THE INVENTION

This invention relates to the method for transferring organic pigment from an aqueous pulp of the pigment to a water-immiscible organic vehicle by mixing said aqueous pulp and said vehicle until a major portion of the water present in said pulp separates. In accordance with the instant invention, a petroleum sulfonate additive and at least one additive selected from the class consisting of sulfonated sperm oil or salts thereof, sulfated sperm oil, and mixtures thereof, is incorporated with said pigment and vehicle.

DESCRIPTION OF THE PREFERRED EMBODIMENTS

It has been discovered in accordance with the instant invention that an organic pigment may be dispersed in a hydrophobic organic vehicle through the use of petroleum sulfonate additive and sulfonated sperm oil or salts thereof, or sulfated sperm oil or mixture thereof. The use of cationic surface-active materials as per the disclosures of U.S. Pat. Nos. 2,192,854 and 2,219,395 is not necessary nor is the inclusion of a salt of a sulfated lower aliphatic alcohol.

The method of this invention is particularly useful with alkali blue pigment ranging from the green shades to the red shades. The structure, manufacture, uses and properties of alkali blue pigments are described by G. R. Buckwalter at pages 617 to 624 of the *Handbook of Pigments*, published by John Wiley and Sons, 1972 edition. Said description is incorporated herein by reference. As described in the *Handbook of Pigments*, an alkali blue pigment is in itself a water-insoluble sulfonic acid or internal salt. The commercial pigment is prepared by the addition of an acid to a solution of the sodium salt. While the method and additive of this invention are particularly suited for flushing an alkali blue pigment, the invention is also applicable to other organic pigments such as azo red, particularly Nos. 48, 52, and 57, diarylide AAA yellow, particularly No. 12, and phthalocyanine blue, particularly No. 15.

The aqueous pulp of the pigment is the presscake formed upon filtration of an aqueous slurry of the precipitated pigment. The press cake still contains a large amount of water, i.e., about 60 to 90 percent by weight. The proportion of presscake to vehicle will have a very wide range depending upon the concentration of pigment in the vehicle that is ultimately desired and which may range from a very small percentage of presscake to a very high percentage of presscake.

Any of the hydrophobic organic vehicles that are commonly used in printing ink and coating compositions may be employed in the method and composition of this invention. Such vehicles are represented by drying, semi-drying and non-drying oils, litho varnishes, mineral oils, rosins, dimerized rosins, esters of dimerized rosins, aliphatic and aromatic hydrocarbon resins, alkyl aromatic resins, maleic and fumeric-modified rosin, phenolic resin, phenolic-modified rosin esters, alkyd resins, urethane-modified alkyds, polyolefins, polyindenes, cumarone/indene resins, phthalate esters, castor oil, fish oil, linseed oil, gloss varnishes, and the various heat-set, quick-set and steam-set vehicle systems.

The term "petroleum sulfonate" is well understood by those skilled in the art. The preparation of petroleum sulfonate is described in Vol. 19, page 296 and 297 of Kirk-Othmer *Encyclopedia of Technology*, second edition, copyright 1969, published by Interscience publishers, a division of John Wiley & Sons, Inc., New York, London, Sydney and Toronto.

The term "sulfonated sperm oil" as used herein means either the sulfonic acid produced by the sulfonation of sperm oil or the alkali metal or ammonium salt of the acid. The sulfated sperm oil is an essentially neutral sulfate ester produced by the action of sulfuric acid on sperm oil. Sperm oil, as is known to those skilled in the art, is a natural product obtained from the sperm whale; the general composition of which is as follows:

5.0%—Myristic acid—$C_{14}$,
4.0%—Myristoleic acid—$C_{14}$,
6.5%—Palmitic acid—$C_{16}$,
26.5%—Palmitoleic acid—$C_{16}$,
37.5%—Oleic acid—$C_{17}$,
19.0%—Eicasapolyenoic acid—$C_{20}$,
1.5%—Other acids—$C_{12}$-$C_{24}$.

The recent move to save whales has forced manufacturers to develop "synthetic oil". Such synthetic oils have compositions substantially the same as the above and are presently available on the market. A synthetic sulfated sperm oil called AESS (aliphatic ester sulfate substitute) works equally well with the instant invention. Accordingly, the terms "sulfonated sperm oil" and "sulfated sperm oil" as used herein include product obtained from both the natural sperm oil from the sperm whale and the synthetic sperm oil.

The additives or surfactants according to the instant invention may be added to the aqueous slurry of the precipitated pigment before filtration thereof, to the press cake directly, to the organic vehicle before admixture with the presscake, to a mixture of the vehicle and press cake, or to the mixture of vehicle and pigment after the water is removed.

Generally, the amount of petroleum sulfonate additive employed is from about 10 percent to 40 percent while the amount of sulfated sperm oil, sulfonated sperm oil or mixtures thereof is from about 1 percent to about 15 percent all based on the dry weight of the pigment contained in the pulp or presscake. Preferably, the amount of petroleum sulfonate additive is from about 15 percent to 30 percent and the sulfonated sperm oil or sulfated sperm oil additive is from about 1 to 10 percent of the pigment's dry weight.

As previously pointed out, a mixture of the sulfonated sperm oil and the sulfated sperm oil may be used.

The two surfactants may be mixed in any proportion but an especially useful mixture contains about 60 parts of sulfonate to 40 parts of sulfate by weight.

Convention flushing equipment such as high shear homogenizers, a Kady mill, sigma-blade mixers and the like may be used to mix the pulp, vehicle and additive. The mixing is usually carried out at ambient temperature, for example, about 70° to 85° F. Higher temperatures up to about 200° F. may be employed.

As the mixing proceeds, the pigment surfaces become receptive to the organic vehicle and water separates from the aqueous pulp. This water is removed from the mixture by decantation, centrifugation or other mechanical means. The time required for the separation of the water, i.e., by weight about 60 to 95 percent, preferably 75 to 95 percent, depends upon a number of factors, including the viscosity of the pulp which in turn is related to the amount of pigment in said pulp, the temperature, the type and amount of organic vehicle and the amount of flushing aid.

The following examples are illustrative of the method and composition of this invention. Throughout this application, all parts are by weight and all temperatures are in degrees Fahrenheit unless otherwise indicated.

EXAMPLE 1

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 122 parts of a 25:275 weight ratio sulphated sperm oil/vehicle mixture. The twitchell reagent is a sulfonated naphthelenic hydrocarbon having a formula reputed to be $C_{18}H_{35}O_2 \cdot C_{10}H_6SO_3H$. This product is sold by Emery Industries under the name Twitchell Base 8911U. Sulphated sperm oil is sold by Refined Onyx Company as Aliphatic Ester Sulphate and the vehicle is a 30:70 polyindene/heat-bodied-linseed oil vehicle. Frictional heat causes the temperature to rise to about 87° after 18 minutes and 333 parts of water are decanted from the mixture. Another portion of the presscake is added to the mixture along with 16 parts of the sulphated sperm oil/vehicle mixture. After 10 minutes, the temperature is 93° and 248 parts of water are decanted. The remaining three portions of presscake are charged separately along with additional amounts of the vehicle alone (no sulphated sperm oil) totaling 294 parts. The temperature eventually reaches 118°. About 83 percent of the water which was present in the presscake is removed by the decanting process.

The mixture is then let down with 132 parts of a triple O lithographic varnish [OOO Litho] along with 10 parts of 25 percent solution of antioxidant in a hydrocarbon solvent sold under the trademark Magie 47 by the Magie Brothers Company and the dispersion is mixed under reduced pressure to remove the residual water. 240 parts of Magie 520 hydrocarbon solvent is added and drying of the flushed color is completed under reduced pressure to give 1448 parts of product.

EXAMPLE 2

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 94 parts of a 100:200 weight ratio sulphated sperm oil/vehicle mixture. The twitchell reagent, sulphated sperm oil and the vehicle are the same as Example 1. Frictional heat causes the temperature to rise to about 83° after 12 minutes and 256 parts of water are decanted from the mixture. Another portion of the presscake is added to the mixture along with 44 parts of the sulphated sperm oil/vehicle mixture. After 11 minutes, the temperature is 88° and 185 parts of water are decanted. The remaining three portions of presscake are charged separately along with additional amounts of the vehicle alone (no sulphated sperm oil) totaling 295 parts. The temperature eventually reaches 106°. About 77 percent of the water which was present in the presscake is removed by the decanting process.

The mixture is then let down with 132 parts of a triple O lithographic varnish [000 Litho] along with 10 parts of 25 percent solution of an antioxidant in a hydrocarbon solvent sold under the trademark Magie 47 by the Magie Brothers Company and the dispersion is mixed under reduced pressure to remove the residual water. 240 parts of Magie 520 hydrocarbon solvent is added and drying of the flushed color is completed under reduced pressure to give 1445 parts of product.

EXAMPLE 3

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 76 parts of a 50:250 weight ratio sulphated sperm oil/vehicle mixture. The twitchell reagent, sulphated spherm oil and the vehicle are the same as Example 1. Frictional heat causes the temperature to rise to about 76° after 40 minutes and 384 parts of water are decanted from the mixture. Another portion of the presscake is added to the mixture along with 32 parts of the sulphated sperm oil/vehicle mixture. After 45 minutes, the temperature is 94° and 280 parts of water are decanted. The remaining three portions of presscake are charged separately along with 30 parts sulphated sperm oil/vehicle mixture and additional amounts of the vehicle alone (no sulphated sperm oil) totaling 294 parts. The temperature eventually reaches 132°. About 81 percent of the water which was present in the presscake is removed by the decanting process.

The mixture is then let down with 132 parts of a triple O lithographic varnish [OOO Litho]. 10 parts of 25 percent solution of an antioxidant in a hydrocarbon solvent sold under the trademark Magie 47 by the Magie Brothers Company along with 65 parts of Magie 520 hydrocarbon solvent is added. An additional 175 parts of Magie 520 is then added and the dispersion is mixed under reduced pressure to remove the residual water. Drying of the flushed color is completed under reduced pressure to give 1414 parts of product.

EXAMPLE 4

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 116 parts of a 50:250 weight ratio sulfonated sperm oil salt/vehicle mixture. The twitchell reagent and vehicle are the same as in Example 1. The sulfonated sperm oil salt is the sodium salt of sperm oil sulfonic acid sold under the trademark Eureka 400. Frictional heat causes the temperature to rise to about 77° after 35 minutes and 266 parts of water are decanted from the mixture. Another portion of the presscake is added to the mixture along with 22 parts of the sulphonated sperm oil salt/vehicle mixture. After 7 minutes, the temperature is 88° and 345 parts of water are decanted. The remaining three portions of presscake are charged separately along with additional amounts of the vehicle alone (no sulphonated sperm oil salt) totaling 294 parts. The temperature eventually reaches 126°. About 85 percent of the water which was present in the presscake is removed by the decanting process.

The mixture is then let down with 132 parts of a triple O lithographic varnish [OOO Litho]. 10 parts of 25 percent solution of an antioxidant in a hydrocarbon solvent sold under the trademark Magie 47 by the Magie Brothers Company along with 93 parts of Magie 520 hydrocarbon solvent are then added. 191 additional parts of Magie 520 hydrocarbon solvent is then added and the dispersion is mixed under reduced pressure to remove the residual water. Drying of the flushed color is completed under reduced pressure to give 1475 parts of product.

EXAMPLE 5

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 99 parts of a 75:225 weight ratio sulphonated sperm oil salt/vehicle mixture. The twitchell reagent, sulphonated sperm oil salt and vehicle are the same as Example 4. Frictional heat causes the temperature to rise to about 82° after 22 minutes and 337 parts of water are decanted from the mixture. Another portion of the presscake is added to the mixture along with 39 parts of the sulphonated sperm oil salt/vehicle mixture. After 11 minutes, the temperature is 90° and 272 parts of water are decanted. The remaining three portions of presscake are charged separately along with additional amounts of the vehicle alone (no sulphonated sperm oil salt) totaling 294 parts. The temperature eventually reaches 126°. About 82 percent of the water which was present in the presscake is removed by the decanting process.

The mixture is then let down with 132 parts of a triple O lithographic varnish [OOO Litho]. 10 parts of 25 percent solution of an antioxidant in a hydrocarbon solvent sold under the trademark Magie 47 by the Magie Brothers Company along with 93 parts of Magie 520 hydrocarbon solvent are then added. 192 additional parts of Magie 520 hydrocarbon solvent is added and the dispersion is mixed under reduced pressure to remove the residual water. Drying of the flushed color is completed under reduced pressure to give 1473 parts of product.

EXAMPLE 6

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 138 parts of a 25:275 weight ratio sulphonated sperm oil salt/vehicle mixture plus 13 parts vehicle alone. The twitchell reagent, sulphonated sperm oil salt and vehicle are the same as in Example 4. Frictional heat causes the temperature to rise to about 72° after 30 minutes and 384 parts of water are decanted from the mixture. Another portion of the presscake is then added to the mixture. After 7 minutes, the temperature is 78° and 282 parts of water are decanted. The remaining three portions of presscake are charged separately along with additional amounts of the vehicle alone (no sulphonated sperm oil salt) totaling 294 parts. The temperature eventually reaches 110°. About 84 percent of the water which was present in the presscake is removed by the decanting process.

The mixture is then let down with 132 parts of a triple O lithographic varnish [OOO Litho]. 10 parts of 25 percent solution of an antioxidant in a hydrocarbon solvent sold under the trademark Magie 47 by the Magie Brothers Company along with 93 parts of Magie 520 hyrocarbon solvent are then added. 191 additional parts of Magie 520 hydrocarbon solvent is added and the dispersion is mixed under reduced pressure to remove the residual water. Drying of the flushed color is completed under reduced Pressure to give 1461 parts of product.

EXAMPLE 7

A presscake containing 550 parts (24 percent by weight of the presscake) of a red shade alkali blue pigment is divided into 6 equal portions. Two portions of the presscake are mixed in a sigma blade mixer at room temperature (about 70°) with 110 parts of twitchell reagent and 81 parts of a 20:80 polyindene/fish oil vehicle referred to herein as vehicle A. The twitchell reagent is the same as in Example 1. After 10 minutes, 187 parts of water are decanted from the mixture. Another portion of the presscake is added to the mixture along with 29 parts of vehicle A. Afer 8 minutes, 243 parts of water are decanted. The remaining three portions of presscake are charged separately along with 28 parts of vehicle A and amounts of vehicle B totaling 297 parts. Vehicle B is a 30:70 polyindene/heat-bodied-linseed oil vehicle. About 85 percent of the water which was present in the presscake is removed by the decanting process.

The mixture is then let down with 132 parts of a triple O lithographic varnish [OOO Litho]. 10 parts of 25 percent solution of an antioxidant in a hydrocarbon solvent sold under the trademark Magie 47 by the Magie Brothers Company along with 65 parts of Magie 52 hydrocarbon solvent. 174 additional parts of Magie 520 hydrocarbon solvent is added and the dispersion is mixed under reduced pressure to remove the residual water. Drying of the flushed color is completed under reduced pressure to give 1425 parts of product.

The table below illustrates the yield value and viscosity for the products of Examples 1-6, illustrating the instant invention, as compared to a commercial product prepared by a process similar to that of Example 7. The yield value and the viscosity were determined with a Laray viscometer. The Laray viscometer and its operation is described in pages 48-52 and more specifically on pages 51 and 52 of *Paint Flow and Pigment Dispersion* by Temple C. Patton; second edition, published by John Wiley and Sons, New York, Chichester, Brisbane and Toronto.

TABLE

| Example No. | Yield Value (Dynes/cm$^2$) | Viscosity (Poise) |
| --- | --- | --- |
| 1 | 281 | 105 |
| 2 | 430 | 210 |
| 3 | 365 | 120 |
| 4 | 487 | 55 |
| 5 | 300 | 51 |
| 6 | 132 | 70 |
| Commercial Product | 1731 | 850 |

From the above, it can be seen that the addition of the sulfated sperm oil or sulfonated sperm oil salt and petroleum sulfonate (Twitchell reagent) greatly reduces the yield value and viscosity of a flushed pigment when compared to a similar commercial product containing only the Twitchell reagent as determined by a Laray viscometer.

Further, this was accomplished with no loss in tint strength. In fact, the tint strength of the products of Examples 1-6 were all about 1 percent greater than the commercial product. The products of all the examples were checked for black ink toning properties and it was found that the black ink toning properties of the products of all six of the examples of the invention were only slightly less, and in most cases, very very slightly less than the commercial product. Thus, the above improvements in yield and viscosity were accomplished without any appreciable sacrifice in black ink toning properties.

It will be apparent to one of ordinary skill in the art that many changes and modifications can be made to the invention described herein without departing from the spirit and scope thereof.

The embodiments of the invention in which an exclusive privilege or property is claimed are defined as follows:

1. In the method for transferring an organic pigment from an aqueous pulp of the pigment to a water-immiscible organic vehicle by mixing said aqueous pulp and said vehicle until a major portion of the water present in said pulp separates, the improvement comprising incorporation a petroleum sulfonate additive and at least one additive selected from the class consisting of sulfonated sperm oil, sulfated sperm oil, and mixtures thereof with said vehicle and said pigment.

2. The method of claim 1 wherein said pigment is an alkali blue pigment.

3. The method of claim 1 wherein said aqueous pulp contains by weight about 60 to 90 percent water, petroleum sulfonate is added in an amount of about 10 to 40 percent and said additive selected from the group consisting of sulfated sperm oil, sulfonated sperm oil and mixtures thereof is added in an amount of about 1 to 15 percent all based on the weight of the dry pigment in the presscake.

4. The method of claim 3 wherein said mixing is performed at a temperature of about 70° to 200° F. for a period sufficiently long to remove from about 60 to 95 percent by weight of the water in the presscake.

5. A composition consisting essentially of an aqueous organic pigment pulp, a water-immiscible organic vehicle, and (1) a petroleum sulfonate and (2) at least one additive selected from the class consisting of sulfonated sperm oil, sulfated sperm oil, and mixtures thereof.

6. The composition of claim 5 wherein the amount of said petroleum sulfonate additive (1) is about 10 to 40 percent and said additive (2) selected from the group consisting of sulfated sperm oil, sulfonated sperm oil and mixtures thereof is from about 1 to 15 percent all based on the weight of the dry pigment in the presscake and said aqueous pulp contains about 60 to 90 percent water.

7. The composition of claim 6 wherein said additive (2) is sulfated sperm oil.

8. The composition of claim 6 wherein said additive (2) is sulfonated sperm oil.

9. The composition of claim 6 wherein said organic pigment is an alkali blue pigment.

10. The composition of claim 9 wherein said additive (2) is sulfated sperm oil.

11. The composition of claim 9 wherein said additive (2) is sulfonated sperm oil.

* * * * *